March 8, 1932.  W. R. McDONALD  1,848,833
AUTOMATIC WEIGHING DEVICE
Filed June 21, 1930
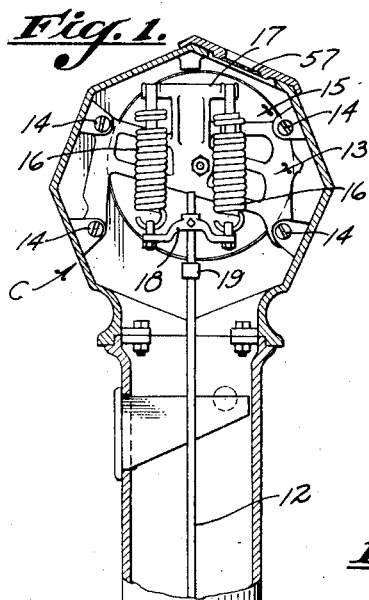
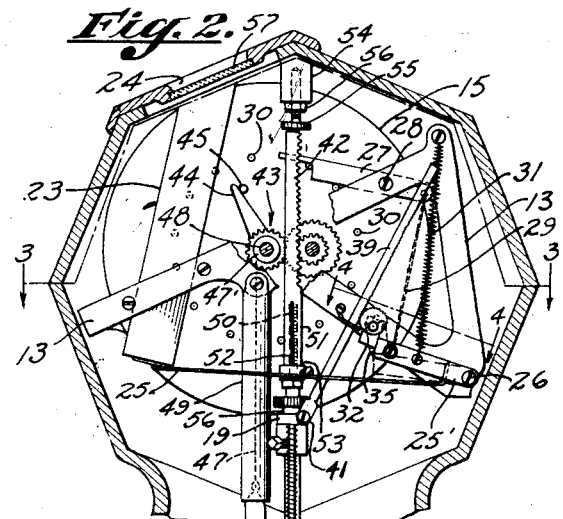
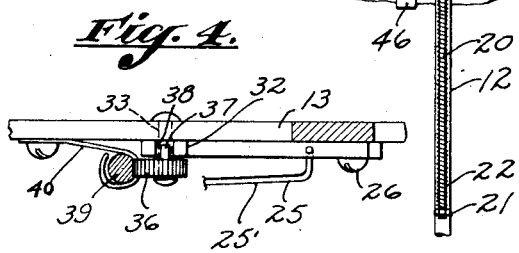
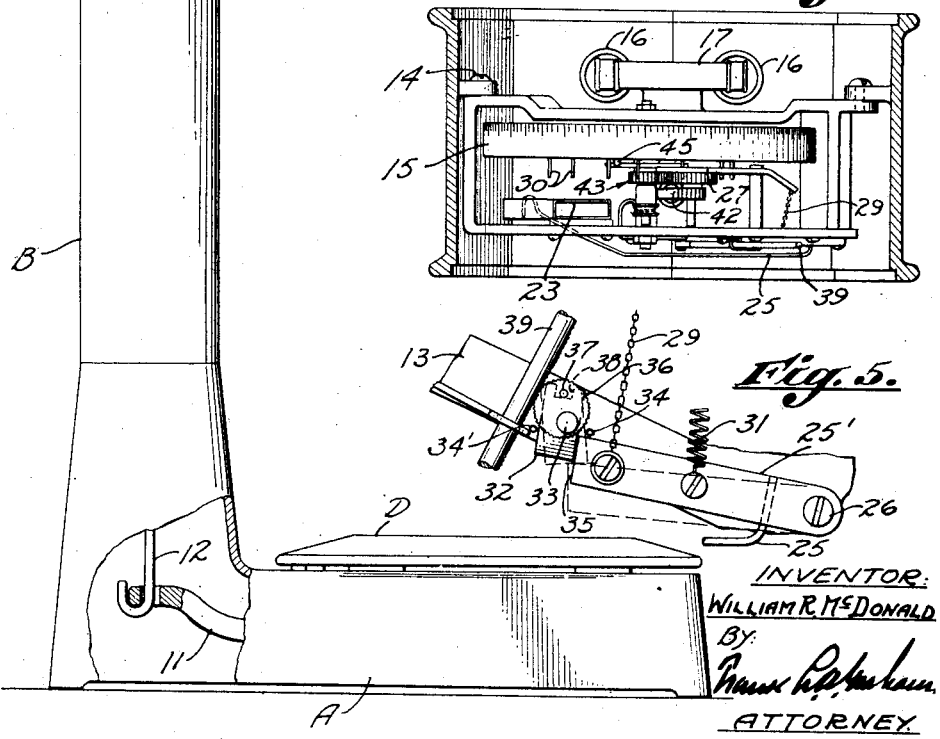
INVENTOR:
William R. McDonald
BY:
ATTORNEY.

Patented Mar. 8, 1932

1,848,833

UNITED STATES PATENT OFFICE

WILLIAM R. McDONALD, OF LOS ANGELES, CALIFORNIA, ASSIGNOR TO LESLIE H. STARK, OF LOS ANGELES, CALIFORNIA

AUTOMATIC WEIGHING DEVICE

Application filed June 21, 1930. Serial No. 462,790.

The present application refers to my co-pending application, Serial No. 386,242, filed August 16, 1929, and provides an automatic weighing device substantially of the general character described in the aforesaid co-pending application, with improvements provided in the operating mechanism thereof.

In said co-pending application, I have disclosed an automatic weighing device having a gravity actuated indicating mechanism. The purpose of the present invention is to provide a mechanical means for actuating the indicating mechanism.

Since scales of this nature are known to be subjected to hard usage by the public, it is essential that the construction of such scales be designed with sturdiness of parts, which will yield accurate and dependable service. In the mechanism embodied in this invention, particular attention has been given to the means for transmitting a movement of the weighing platform to the weight-indicating mechanism, the means provided consisting of a rack member connected to the platform in a manner to receive movement from the platform corresponding to the weight placed upon the platform, together with gear means arranged on the indicating dial for rotating the dial correspondingly with the movement of the platform; the whole assembly being arranged to transmit a movement directly from the weighing platform to the weight-indicating mechanism by a delayed mechanical action. Other means is also provided in this invention for latching and unlatching the indicating dial by a coin deposited in the slot, the two means being correlated in such a manner that a person may step upon the weighing platform and deposit a coin, whereupon the device will operate to indicate the weight. Means is also provided for latching the device against additional weights being secured upon the deposit of a single coin.

Other features will become apparent as the description proceeds in conjunction with the drawings, in which—

Fig. 1 is a side elevation of my scale partly in section, showing parts of the operating mechanism;

Fig. 2 is a side view partly in section, showing the opposite side of the head from that of Fig. 1;

Fig. 3 is a view taken on line 3—3 of Fig. 2;

Fig. 4 is a fragmentary view taken on line 4—4 of Fig. 2; and

Fig. 5 is a front elevation of Fig. 4.

In the drawings, I have illustrated my device as comprising a base A, having connected therewith an upright column B. On the upper end of the upright column B is mounted a head member, generally designated C. The base A consists of the usual movable weight-receiving platform D, which is operably connected by means of a lever 11 to a rod 12, which extends upwardly through the column B, and is operably connected to the weight-indicating mechanism within the head C.

Suitably mounted within and attached to the head member C is a bracket generally designated 13, said bracket being connected to the head C by means of suitably spaced bolts 14. Rotatably mounted within the bracket 13 is a weight-indicating dial generally designated 15. Means is provided for rotating the dial 15 in response to weights placed upon the platform D, and preferably consists of springs 16 suitably suspended from the bracket 13 with means, such as shown at 17, and connected at their lower ends to support the rod 12, as shown at 18. This arrangement will be recognized as providing a spring-supported means for sustaining a weight upon the platform D, and it is evident that the springs will permit the rod 12 to travel downwardly in response to any weight placed upon said platform. The downward travel of the rod 12 is transmitted to the weight-indicating dial 15 by means, such as an arm 19, securely mounted on the rod 12, said arm extending across to the opposite side of the head and slidably engaging a depending rod 20. The depending rod 20 is provided at its lower end with a lock nut 21, and a coil spring 22 is interposed between said lock nuts and the arm 19. This arrangement provides a means of allowing the arm 19 to travel downwardly on the rod 20 without actuating the indicating dial 15, until said dial is released by the coin actuated mechanism.

Means is provided for releasing the scale for operation by the deposit of a coin, and, as illustrated, consists of a coin tube 23 suitably mounted upon the bracket 13 and arranged to receive a coin deposited through a slot 24 in the head C. The coin descends through the tube 23 and impacts an arm 25, which is secured to a plate 25' pivotally mounted, as shown at 26, upon the bracket 13, and depresses said arm upon said pivot. The depression of the arm 25 rotates the plate 25', which, in turn, rotates a catch member 27 upon a pivot point 28 by means of a flexible connecting member 29. The dial 15 is equipped with a plurality of upstanding pins 30 circumferentially spaced on the back thereof, said pins being arranged in a manner to engage the outer end of the latch member 27 when the latch member is in a normal position, but adapted to pass said latch member when it has been raised by the operation of the arm 25.

A retractile spring 31 is incorporated with the arm 25 and the plate 25', to hold the arm 25 in an elevated position, and permits the latch member 27 to fall into an engaging position. Means is also incorporated with the above means for holding said latch member 27 in an unlatched position after the deposit of a coin, until the weight is removed from the weight-receiving platform, and the weight-indicating dial starts to return to its normal position, such means preferably consisting of a pawl member 32 rotatably mounted upon the bracket 13 by means of a pin such as shown at 33. The pawl member 32 is adapted to engage the outer end 35 of the plate 25', when said plate is in an elevated position, and so designed as to rotate upon the pin 33 and dispose said pawl 32 over the top of the plate 25' as shown in a dotted position, and provides a means for holding said plate in a depressed position. The means provided for rotating the pawl 32 consists of a knurled member 36 eccentrically mounted upon the pin 33 and superposed upon the pawl 32. The member 36 is provided with a pin 37 arranged to fit within a slot 38 in the upper extremity of the pawl 32. This arrangement will be appreciated as providing a means of imparting a limited rotation to the pawl member 32.

In order to prevent excessive rotation of the pawl and stop the pawl in a proper position for holding the arm 25 in a depressed position, I have provided a pin 34 in the bracket 13, and have also provided a pin 34' on the opposite side of the pawl to prevent an excessive backward movement. These two pins cooperate with pin 33 and permit said pawl a limited rotative movement. The means for imparting a limited rotation to the segmental gear 36 comprises a member 39 knurled on one side thereof and arranged to engage the knurled member 36, said knurled member being guided and held in loose contact with the member 36 by means of a guide 40 mounted upon the bracket 13. The lower end of the member 39 is pivotally connected to the rod 20, as shown at 41. It will be noted that the member 39 is given an inclination which will cause the rod 39 to fall upon the member 36 and give it an initial movement after which the rod 39 will slide upon the member 36 and only slightly engage the knurled teeth without causing further movement. It is understood by this arrangement that the rod 39 is caused to travel with the rod 20, and until the plate 25' is depressed by the deposit of a coin, will slide over the member 36. If the rod 39 reaches the limit of its downward travel before a coin is deposited, the pawl 32 is so overbalanced by its own weight that it will swing into position of its own accord as soon as the plate 25' is depressed by the deposit of a coin.

As hereinbefore stated, the arm 19 is connected with the platform D, and travels downwardly in proportion to the weight placed upon the platform. Unless the weight-indicating mechanism has been previously released by the deposit of a coin, the only effect will be to compress the spring 22 upon the rod 20. However, as soon as the coin is deposited in the slot 24, and by descending the tube 23, it impacts the arm 25, the weight-indicating mechanism is released, and is free to rotate under the urge of the spring 22. The means employed to transmit rotation from the rod 20 to the dial 15 consists of a rack member 42 mounted upon the upper end of the rod 20 and arranged to engage a compounded train of gears, as shown at 43. These gears, in turn, rotate an arm 44 which bears against a pin 45 that is mounted upon the dial member 15. It is thus clear that as the rod 42 descends, the gear train 43 is rotated and the arm 44 brings pressure against the pin 45 to rotate the dial which, in turn, indicates the corresponding weight. The rack 42 will be observed to travel downwardly under the urge of the spring 22 only until it again engages the arm 19 and is brought to a stop. By providing a loose connection in the shape of the arm 44 and the pin 45 on the indicating dial, no jarring or strain upon pivot points caused by sudden starting and stopping is set up in any part of the mechanism, the dial being left free to rotate beyond the point of rest, and to return to said point under the urge of a weight 46 which, by means of a chain 47 that encircles a pulley 47' secured to the shaft 48 upon which the arm 44 is securely mounted, tends to rotate the dial in a direction opposite to the urge of the arm 44. The weight 46 may be closed in a tube member 49 to prevent entanglement with other parts of the apparatus. After the weight is removed from the platform D and the arm 19 has returned to its normal position of rest, it is obvious that the arm 44 has also been returned to a position of rest, and that the dial 15 traveling now under the urge of the weight 46 will return more slowly and finally come to rest at the zero point when the pin 45 again engages the arm 44. Clearly, this arrangement eliminates any jar or shock caused by the sudden return or the sudden depressing of the weight-indicating dial. And since such mechanisms are provided with fine bearings in order to provide the utmost accuracy, it is clearly obvious that this arrangement meets all requirements for this purpose.

As a means of providing the utmost accuracy, I have incorporated an adjustable feature in the connection between the rod member 20 and the rack member 42, said adjustment consisting of a screw-threaded portion 50 upon said rod 20 adapted to screw-threadedly engage an interiorly threaded sleeve 51 upon the rack member 42. The sleeve is longitudinally slotted as shown at 52 and is provided with a clamping collar 53 to hold the adjustment once it is fixed.

Means is provided for adjustably stopping the rack 42 in its upward travel to bring the weight-indicating mechanism to a proper zero reading and, as shown, comprises a boss 54 mounted upon the head C and a screw-threaded member 55 mounted therein. A lock nut 56 is provided on the screw-threaded member 55 for the purpose of locking member 55 in adjusted position. The rack 42 is arranged to strike the screw-threaded member 55 and come to rest at this point. This arrangement provides a means for adjustably regulating the upward travel of the rack 42.

In operation, a person steps upon the platform D. The rod 12 is correspondingly depressed and lowers the arm 19, thereby compressing the spring 22 about the rod 20. This also draws the knurled rod 39 over the knurled member 36, but the pawl 32 engaging the outer end of the plate 25' receives no action therefrom. So far, the only result has been to compress the spring 22 by the arm 19. In order to release the weight-indicating mechanism, a person deposits a coin in the slot 24. The coin descends the tube 23 and impacts the arm 25, which rotates the plate 25' upon the pivot point 26. The pawl 23 immediately slips into the dotted position shown in Fig. 5 and holds the arm 25 in a depressed position. The movement of the arm 25 operates to raise the catch member 27 which allows the dial 15 to rotate. At this point, the spring 22, having been put under compression by the movement of the arm 19, is free to force the rack member 42 to travel downwardly until a stop nut 56 on the rod 20 again engages the arm 19. The rack member 42 actuates the gear train 43 and rotates the arm 44, which, being in engagement with the pin 45, rotates the dial 15 correspondingly. The weight is then read directly from the dial through an aperture 57 in the head C. The rotation of the dial 15 operates to raise the weight 46 by winding the chain 47 upon the pulley 47'. As the person steps from the platform B, the rack 42 is forced upward by the arm 19 under the urge of the weight-supporting springs 19. The rack comes to rest when it engages the screw-threaded stop member 55, and the arm 44 returns to its initial position. The dial 15 returns to its initial position under the urge of the weight 46 whereupon the pin 45 again engages the arm 44 and the dial comes to rest at zero. During this operation, the member 39 has rotated the knurled member 36, and has removed the pawl 32 from the top of the plate 25', whereupon the plate 25', under the urge of the spring 31, returns to its normal elevated position, thus allowing the latch member 27 to again engage a pin 30 and hold the dial in a located position. The device is then ready for another operation. It is a feature of this arrangement that as soon as the member 39 starts upward with the rack 42, which movement starts the instant the weight is removed or lessened on the platform D, the pawl 32 is removed and allows the catch member 27 to fall into engaging position. This prevents any accurate additional weights being obtained, since the dial is held against any forward rotative movement, and may only rotate to its zero position.

Although I have shown a single embodiment of my invention, I am aware that other expedients and equivalents may be used throughout to produce the same results. Consequently, I do not wish to be restricted to the particular form shown, but intend this disclosure to include all such modifications and alterations arising out of the substitution of equivalents and the use of various expedients that come within the scope of the specification and the purview of the appended claims.

I claim as my invention:

1. In an automatic weighing device having a weight-receiving platform and a weight-indicating mechanism: means for operating said weight-indicating mechanism by movement of said platform, said means including a rod operably connected to said platform to transmit movement therefrom; a gear rack having an extension thereon; an arm secured to said rod and slidably engaging said extension; a spring mounted on said extension and engaging said arm to yieldingly transmit movement from said arm to said rack; and gears associated with said rack and said weight-indicating mechanism to actuate said mechanism in response to movement of said rack.

2. In an automatic weighing device having a weight-receiving platform and a weight-indicating mechanism: means for operating said weight-indicating mechanism by movement of said platform, said means including a rod operably connected to said platform to transmit movement therefrom; a gear rack having an extension thereon; an arm secured to said rod and slidably engaging said extension; a spring mounted on said extension and engaging said arm to yieldingly transmit movement from said arm to said rack; gears associated with said rack and said weight-indicating mechanism to actuate said mechanism in response to movement of said rack; and a coin-released latch arranged to prevent movement of said rack and permit movement of said arm.

In testimony whereof, I have hereunto set my hand at Los Angeles, California, this 9th day of June, 1930.

WILLIAM R. McDONALD.